United States Patent
Frohlicher et al.

(10) Patent No.: US 9,010,791 B2
(45) Date of Patent: Apr. 21, 2015

(54) LOCKING DEVICE FOR LOCKING TOGETHER TWO SLIDABLY MOUNTED TUBES

(75) Inventors: Fabien Frohlicher, Loos (FR); Tony Marais, Fretin (FR); Pierre-Louis Bassetti, Merignies (FR)

(73) Assignee: Decathlon, Villeneuve d'Ascq (FR)

( * ) Notice: Subject to any disclaimer, the term of this patent is extended or adjusted under 35 U.S.C. 154(b) by 50 days.

(21) Appl. No.: 13/992,764

(22) PCT Filed: Mar. 2, 2011

(86) PCT No.: PCT/FR2011/050436
§ 371 (c)(1),
(2), (4) Date: Aug. 26, 2013

(87) PCT Pub. No.: WO2012/089941
PCT Pub. Date: Jul. 5, 2012

(65) Prior Publication Data
US 2013/0328285 A1    Dec. 12, 2013

(30) Foreign Application Priority Data

Dec. 31, 2010 (FR) ..................................... 10 61401

(51) Int. Cl.
*B62K 17/00* (2006.01)
*B62K 19/36* (2006.01)
(Continued)

(52) U.S. Cl.
CPC . *B62K 19/36* (2013.01); *B62J 1/08* (2013.01); *F16B 2/04* (2013.01); *F16B 7/1463* (2013.01); *F16B 7/1427* (2013.01)

(58) Field of Classification Search
CPC ........... B62J 1/08; B62K 19/36; F16B 7/1427
USPC ................... 280/287; 403/109.5; 297/215.13, 297/215.14
See application file for complete search history.

(56) References Cited

U.S. PATENT DOCUMENTS 6,036,214 A    3/2000  Ono
6,142,699 A *  11/2000 Pao ............................. 403/109.5
(Continued)

FOREIGN PATENT DOCUMENTS

CN       201350944 Y    11/2009
DE         9013266 U1   11/1990
(Continued)

OTHER PUBLICATIONS

Author Unknown, Translation of Search Report dated Oct. 2, 2013, ROC (Taiwan) Patent Application No. 100148094 filed Dec. 22, 2011, 1 page.

(Continued)

*Primary Examiner* — Tony Winner
(74) *Attorney, Agent, or Firm* — MH2 Technology Law Group, LLP

(57) ABSTRACT

The invention relates to a locking device (5) for locking together a first tube (2) and a second tube (3), the first tube being slidably received in the second tube, the locking device comprising at least one rod (10) mounted to move into two positions and a cam system made up of at least two cams (6, 7, 8, 9) that are mounted on the first tube to pivot either into a first position in which the cams are not in contact with the second tube and allow the first tube to slide inside the second tube, or into a second position in which each of the cams exerts pressure on the inside face of the second tube and prevents the first tube from sliding inside the second tube. The rod is assembled with the cam system and is configured so that it at least moves the cams into their first position, a repositioning system being configured to return said cams into their second position. The invention also relates to a bicycle (1) equipped with such a locking device (5) arranged between a saddle post (2) and a saddle tube (3).

15 Claims, 4 Drawing Sheets

(51) Int. Cl.
  *B62J 1/08*  (2006.01)
  *F16B 7/14*  (2006.01)
  *F16B 2/04*  (2006.01)

(56) References Cited

U.S. PATENT DOCUMENTS

| | | | |
|---|---|---|---|
| 8,128,306 B2 * | 3/2012 | Gorza | 403/109.3 |
| 8,702,339 B2 * | 4/2014 | Ballentine | 403/322.4 |
| 2004/0208687 A1 * | 10/2004 | Sicz et al. | 403/109.3 |
| 2006/0193679 A1 * | 8/2006 | Lin | 403/109.5 |
| 2007/0215781 A1 | 9/2007 | Watt | |
| 2010/0207351 A1 * | 8/2010 | Klieber | 280/278 |
| 2012/0104810 A1 * | 5/2012 | Walsh | 297/215.13 |

FOREIGN PATENT DOCUMENTS

| | | |
|---|---|---|
| EP | 0849148 A2 | 6/1998 |
| TW | 450907 B | 8/2001 |
| TW | 522954 U | 3/2003 |
| TW | M355888 U | 5/2009 |
| WO | 2009027681 A1 | 3/2009 |

OTHER PUBLICATIONS

Chinese Search Report dated Aug. 4, 2014, Chinese Application No. 2011800636098, pp. 1-2.

* cited by examiner

LOCKING DEVICE FOR LOCKING TOGETHER TWO SLIDABLY MOUNTED TUBES

CROSS REFERENCE TO RELATED APPLICATIONS

This application is a US National Stage entry of International application No PCT/FR2011/050436 filed Mar. 2, 2011 and claiming priority to French application FR 10 61401 filed Dec. 31, 2010, the entire disclosures of which are hereby incorporated herein by reference in their entireties.

FIELD OF THE DISCLOSURE

The present invention relates to a locking device for locking together a first tube and a second tube that are configured to enable said first tube to slide in said second tube. The invention also relates to a bicycle on which a locking device of the invention is arranged, for locking together the saddle post and the saddle tube.

BACKGROUND OF THE DISCLOSURE

Locking devices are already known for locking together a first tube and a second tube, said first tube being configured to slide inside said second tube when the locking device is deactivated. By activating said locking device, it is possible, conversely, to prevent the first tube from sliding relative to the second tube. Such locking devices are, in particular, implemented on bicycles between the saddle post, at the top end of which a saddle is arranged, and the saddle tube arranged on the frame of the bicycle, so as to adjust the height positioning of the saddle.

The international patent application published under the number WO 2009/027681 A1 discloses a locking device comprising a rod arranged longitudinally inside a first tube that consists of a saddle post and that is slidably mounted inside a second tube consisting of a saddle tube, and a cam actuation system making it possible to move said rod in translation along the longitudinal axis of said first tube. That locking device further comprises a first plate arranged at the bottom end of the first tube, a second plate being mounted to slide relative to the first plate along the longitudinal axis of the first tube, that second plate being secured to the bottom end of the rod. The first plate and the second plate are spaced apart by gap that can be varied under the action of the rod. Inside the gap, i.e. between the first and second plates, there is provided an elastically deformable annular plug that, in a rest position, has an outside diameter that is slightly smaller than the inside diameter of the second tube so as to enable said elastically deformable plug and the first tube to slide inside the second tube. By acting on that rod, via the actuation system, it is possible to reduce the gap between the first plate and the second plate, thereby acting on the elastically deformable plug and making it possible to increase the outside diameter of said elastically deformable plug so that it has an outside diameter greater than the inside diameter of the second tube. That makes it possible to compress said elastically deformable plug against the inside face of the second tube, and thus to lock the relative position between the first tube and the second tube.

SUMMARY OF THE DISCLOSURE

The present invention consists of an alternative design for a locking device for locking together a first tube and a second tube, an object of which device is to optimize the effectiveness of the locking, thereby avoiding any slippage between said tubes when a force is exerted along the longitudinal axis between said tubes.

To this end, the invention provides a locking device for locking together a first tube and a second tube that are configured to enable said first tube to slide in said second tube. The locking device comprises at least one rod configured to move inside the first tube and to be driven into two positions, one position corresponding to activating the locking device and the other position corresponding to deactivating the locking device. The rod is driven in this way from outside said first tube. In accordance with the invention, the device further comprises a cam system made up of at least two cams that are mounted on the first tube to pivot about at least one pivot pin perpendicular to a longitudinal axis of the first tube. These cams are configured to pivot either into a first position in which the cams are not in contact with the second tube and allow the first tube to slide inside the second tube, or into a second position in which each of the cams exerts pressure on the inside face of the second tube and prevents the first tube from sliding inside the second tube. In addition, in accordance with the invention, the rod is assembled with the cam system and is configured so that it at least moves the cams into their first position when said rod is in an unlocking position, a repositioning system being configured to return said cams into their second position.

In the present invention, the term "rod" is used to mean an element connecting the cams to a drive part, in particular to an actuation handle, and enabling said cams to move. This element may be a rigid rod, a cable, a spring of high stiffness, or indeed some other member.

In one design of the invention, the locking device has at least one rod and four cams mounted in a cross configuration relative to one another, symmetrically and asymmetrically about the longitudinal axis of the first tube, said cams also being mounted to pivot about the pivot pin passing through the longitudinal axis of the first tube, said pivot pin being fastened to said first tube.

In the locking device of the present invention, the rod extends longitudinally inside the first tube and out through a distal end of said first tube, which distal end is disposed outside the second tube. This makes it possible to actuate the locking device by acting on the rod from the distal end of the first tube. When the device is mounted on a bicycle, with said first tube being constituted by a saddle post, this makes it possible to actuate the rod from the upper end of the saddle post, which end is disposed beneath the saddle.

In the locking device of the invention, the cam system is configured to accentuate the contact pressure of the cams on the inside face of the second tube when a downward force exerted on the first tube and urging said first tube to be moved towards the inside of the second tube is increased. When the locking device is implemented on a bicycle between the saddle post and the saddle tube of said bicycle, this makes it possible to avoid any slippage between the saddle post and the saddle tube when the cyclist sits down and exerts downward forces of various magnitudes on the saddle.

Similarly, in the locking device of the invention, the cam system is configured to accentuate the contact pressure of the cams on the inside face of the second tube when an upward force exerted on the first tube and urging said first tube to be moved towards the outside of the second tube is increased. When the locking device is implemented on a bicycle between the saddle post and the saddle tube, this makes it possible to avoid any slippage of the saddle post towards the outside of the saddle tube when the cyclist lifts the bicycle by holding it via the saddle.

In the above-mentioned design of the locking device of the invention, a return spring is arranged between the cams and the pivot pin that is secured to the first tube, the return spring being configured to exert a force against the cams so as to press said cams against the inside face of the second tube.

In a variant design of the locking device of the invention, the cam system includes two first cams connected together and to pivot by a first pivot pin that is perpendicular to the longitudinal axis of the first tube and that is secured to the rod. In addition, these two first cams are respectively mounted to pivot about a second pivot pin and about a third pivot pin, which second and third pins are perpendicular to the longitudinal axis of the first tube and are disposed symmetrically relative to each other about said longitudinal axis of the first tube.

In this variant design of the locking device of the invention, the cam system includes two second cams connected together and to pivot by a fourth pivot pin that is perpendicular to the longitudinal axis of the first tube. These two second cams are respectively mounted to pivot about the second pivot pin and the third pivot pin, said two second cams being disposed symmetrically relative to the two first cams about an axis of symmetry passing through the second and third pivot pins. In addition, a return spring is arranged between the first pivot pin and the fourth pivot pin. This design makes it possible to lock the first tube relative to the second tube when a force is exerted in either longitudinal direction on the first tube relative to the second tube.

In this variant design of the locking device of the invention, each of the two first cams is provided with an oblong hole configured for slidably receiving the first pivot pin. Similarly, each of the second cams is provided with an oblong hole configured for slidably receiving the fourth pivot pin. This design makes it possible to accentuate the contact force of the cams on the inside face of the second tube when the first tube is urged to move relative to the second tube, in either direction along the longitudinal axis of said tubes.

In the locking device of the invention, said locking device further comprises a drive handle secured to the at least one rod, said drive handle being configured at least to move the rod into its unlocking position, enabling the cams to move into their first position.

In an embodiment, a return spring is arranged between the first tube and the drive handle, said return spring being configured to exert thrust on the rod and to return the cams to their second position.

Naturally, it is possible for the cams to be repositioned manually by means of the drive handle, which is then configured to return the rod(s) to a locking position in which the cams are pressed against the inside face of the second tube.

In the locking device of the invention, the at least two cams are disposed inside the first tube. In addition, said first tube is provided with at least two slots configured to allow the cams to pass through so as to dispose them in their second position in contact against the inside face of the second tube.

In the locking device of the invention, each of the cams has at least one contact surface for coming into contact against the inside face of the second tube, said contact surface being provided with teeth configured to grip the inside face of the second tube. This makes it possible to reinforce the locking of the first tube relative to the second tube.

The invention also provides a bicycle that includes, in particular, a frame having a saddle tube, and a saddle post assembled at its top end to a saddle, said saddle post being mounted to slide in the saddle tube. The saddle post then constitutes the first tube and the saddle tube then constitutes the second tube. In addition, the bicycle further includes a locking device of the invention, arranged between the saddle post and the saddle tube.

In the bicycle of the invention, a drive handle for driving the rod is disposed under the saddle.

In the bicycle of the invention, the saddle post and the saddle tube each have a cross section including two flats opposite each other. In addition, the cams of the locking device are configured to bear against the two flats in the saddle tube. By means of the presence of the flats, this offers the advantage of preventing any movement in rotation between the saddle post and the saddle tube about the longitudinal axis of said post and of said saddle tube. In addition, said flats make it possible to increase the area of contact between the cams and the inside face of the saddle tube, thereby increasing the friction of said cams against the inside face of the saddle tube and thus reinforcing the locking between the saddle post and the saddle tube.

BRIEF DESCRIPTION OF THE DRAWINGS

Other characteristics and advantages of the present invention appear on reading the following description of two designs of the locking device implemented, in particular, on a bicycle, given with reference to figures, in which.

DETAILED DESCRIPTION

Figure 1:
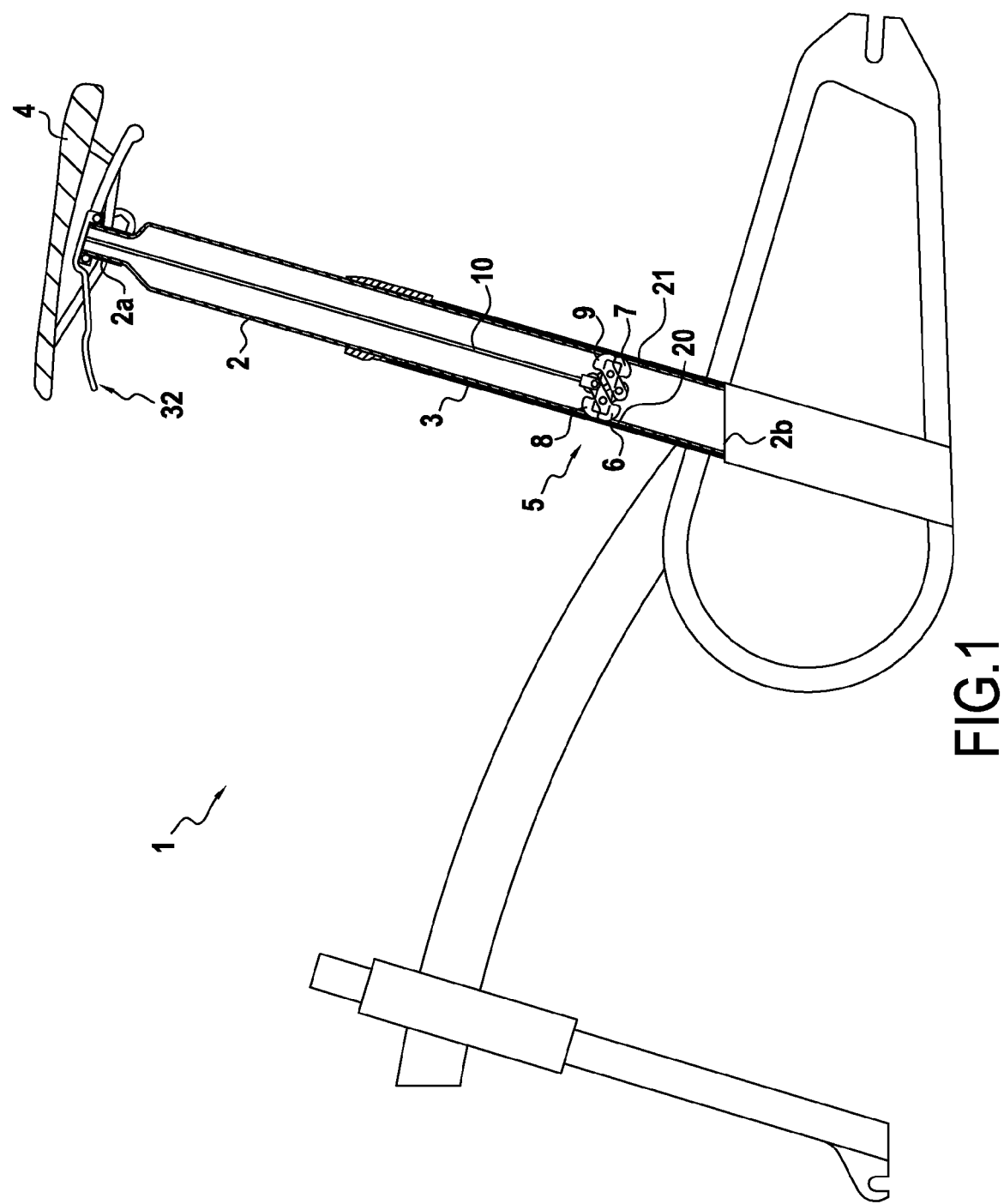
FIG. 1 shows a preferred design of the locking device arranged on a bicycle frame between the saddle post and the saddle tube.

FIG. 1 shows a bicycle frame 1 on which, in conventional manner, a saddle post 2 is arranged that is mounted to slide inside a saddle tube 3. Said saddle post 2 receives a saddle 4 at its top end 2a. FIG. 1 shows how a locking device 5 is implemented that is arranged between the saddle post 2 and the saddle tube 3, the function of which device is to prevent the saddle post 2 from sliding relative to the saddle tube 3.

Figure 2:
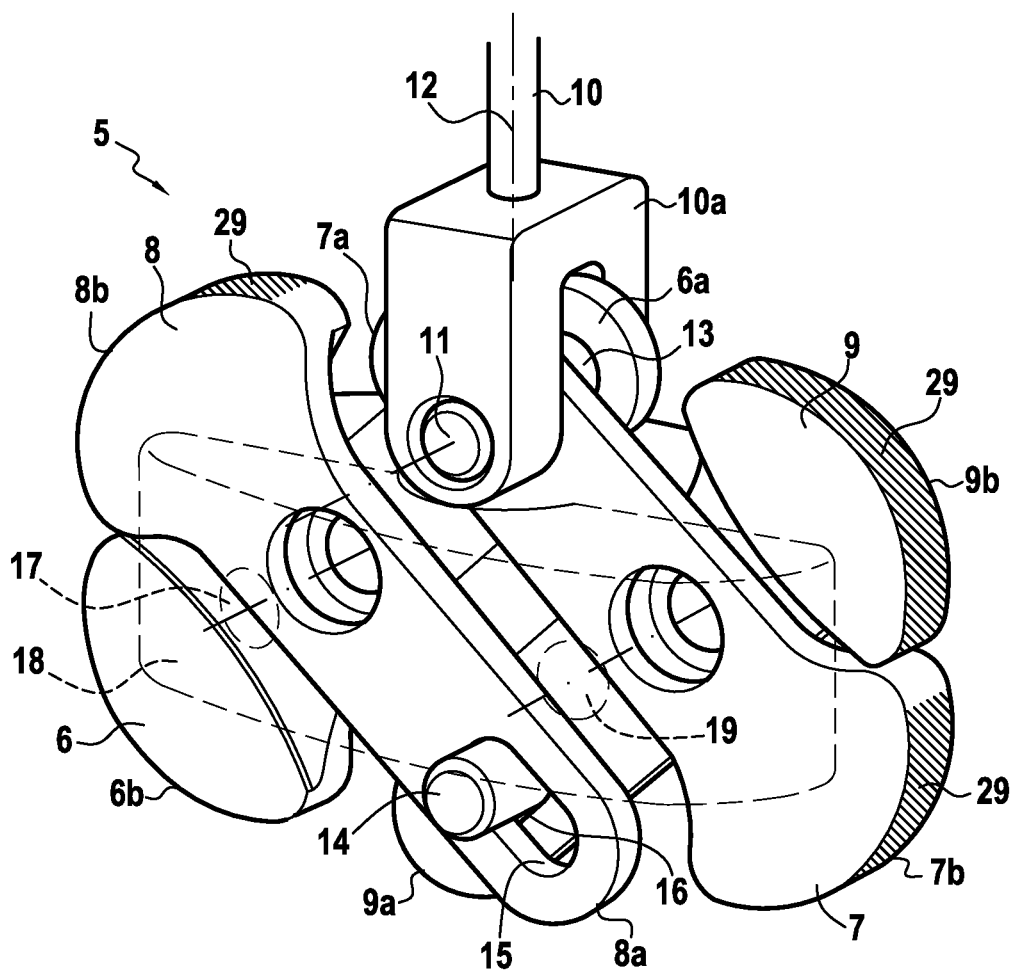
FIG. 2 shows the locking device of FIG. 1.
Figure 3:
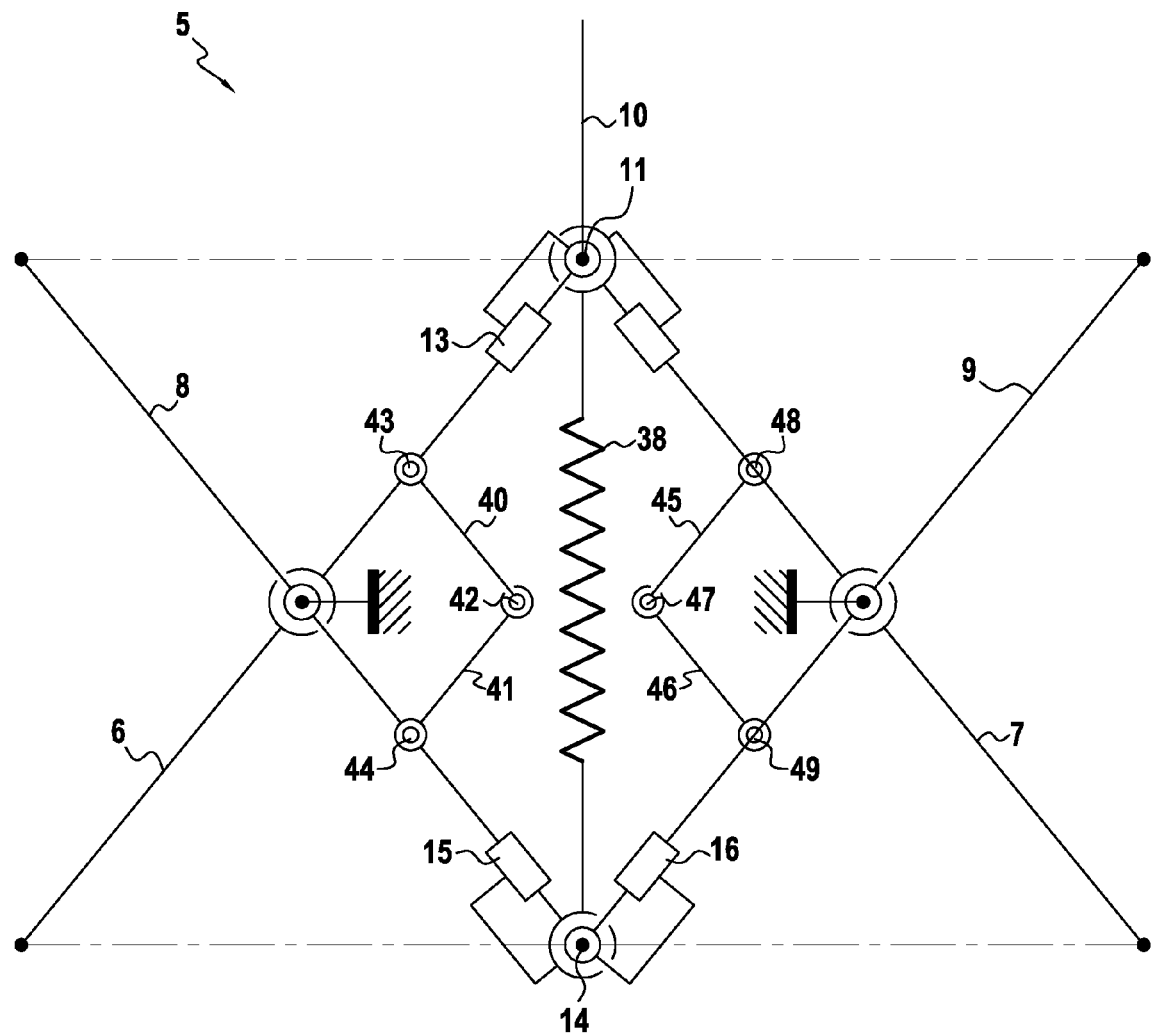
FIG. 3 is a kinematic diagram showing the locking device shown in FIG. 2.

The locking device 5 shown in FIG. 1 can be seen in more detail in FIGS. 2 and 3. It can be observed that the locking device 5 includes a first set of two cams 6, 7 and a second set of two cams 8, 9. The cams 6 and 7 are disposed symmetrically about the longitudinal axis of the saddle post 2, as are the cams 8 and 9. It can also be observed that said locking device 5 further includes a rod 10 making it possible to actuate the cam system made up of said cams 6, 7, 8, 9.

It can be observed in FIG. 2 that the bottom end 10a of the rod is configured to receive, at least pivotally, the proximal ends 6a, 7a of the two first cams 6, 7. For this purpose, a pivot pin 11 is disposed perpendicularly to the longitudinal axis 12 of the rod that extends longitudinally inside the saddle post, along the longitudinal axis of said saddle post, said pivot pin 11 pivotally receiving said proximal ends 6a, 7a of said cams 6, 7.

It can also be observed in FIG. 2 that a first oblong hole 13 is arranged at the proximal end 6a of the first cam 6, said oblong hole slidably receiving the pivot pin 11, thereby making it possible to cause said first proximal end 6a to slide along the oblong hole 13 while concomitantly enabling the cam 6 to pivot relative to the rod 10.

Such an oblong hole is also arranged at the proximal end 7a of the second cam 7. Thus, the two proximal ends 6a, 7a of the cams 6, 7 are capable of sliding relative to the pivot pin 11 and concomitantly of pivoting about said pivot pin 11. The purpose of this design is to make it possible to intensify the pressure exerted by the cams 6, 7 on the inside face of the saddle tube 3 when the saddle post 2 exerts a downward force relative to the saddle tube 3, in particular when the cyclist is sitting on the saddle.

It can also be observed that the second cams 8, 9 are assembled together by means of a pivot pin 14 disposed parallel relative to the first pivot pin 11, i.e. perpendicular to the longitudinal axis 12 of the rod 10 and to the longitudinal axis of the saddle post.

It can be observed that the pivot pin 14 is also mounted to slide in two oblong holes 15, 16 arranged at the proximal ends 8a, 9a of the two cams 8, 9. Thus, the cams 8, 9 pivot relative to each other about a pivot pin and slide relative to each other along the oblong holes 15, 16.

The function of this design is to enable the cams 8, 9 to intensify the contact pressure on the inside face of the saddle tube 3 when the saddle post 2 is being urged to move outwards relative to the saddle tube 3, in particular when the user lifts the bicycle by holding it via the saddle 4, and to release the opposite cams 6, 7.

It can also be observed in FIGS. 2 and 3 that the cam 6 and the cam 8 are connected together by a pivot pin 17 to pivot relative to a stationary part 18 inside the saddle post 2. Similarly, the cam 7 and the cam 9 are connected together and to pivot by a pivot pin 19 that is secured to the stationary part 18 inside the saddle post 2. These two pivot pins 17 and 19 are parallel to the pivot pins 11, 14 and are disposed symmetrically about the longitudinal axis of the saddle post 2, which axis passes through the two pivot pins 11 and 14. It can be observed that the cam 6 and the cam 8 are disposed symmetrically about a transverse axis passing through the pivot pins 17, 19. The same applies for the cams 7 and 9.

It can be observed in FIG. 3 that parts 40, 41, preferably in the form of blades, are connected together and to pivot by a pivot coupling 42. Similarly, the first part 40 is connected to the cam 6 by a pivot coupling 43, and the second part is connected to the cam by a pivot coupling 44. This makes it possible to actuate the cam 6 and the cam 8 simultaneously. A similar design is implemented between the other two cams 7 and 9, as shown diagrammatically in FIG. 3. Thus, two parts 45, 46 are connected together and to pivot by a pivot coupling 47, the first part 45 being connected to the cam 7 by a pivot coupling 48, and the second part 46 being connected to the cam 9 by a pivot coupling 49. This makes it possible to actuate the cams 7 and 9 simultaneously.

It can be observed in FIGS. 1 and 2 that the distal ends 6b, 7b, 8b, 9b of the four cams 6, 7, 8, 9 are configured to come into contact with the inside face of the saddle tube 3. It can be observed in FIG. 1 that the locking device is preferably arranged inside the saddle post 2. For this purpose, the saddle post is provided with slots 20, 21 that can be seen in more detail in FIG. 4, which shows a variant design of the locking device 22, these slots allowing the distal ends 6b, 7b, 8b, 9b of the four cams 6, 7, 8, 9 to pass through, so as to enable them to come into contact with the inside face of the saddle tube 3. It can be observed that the distal ends 6b, 7b, 8b, 9b of the four cams are more or less rounded in shape.

It can be observed in FIG. 3 that a spring 38 is arranged between the pivot pin 11 and the pivot pin 14, this spring 38 extending along the longitudinal axis of the rod 10 and of the saddle post 2. Said spring 38 is mounted so as to be under tension. Its function is to press the cams 6, 7, 8, 9 against the tube 3 after the rod 10 is released.

Figure 4:
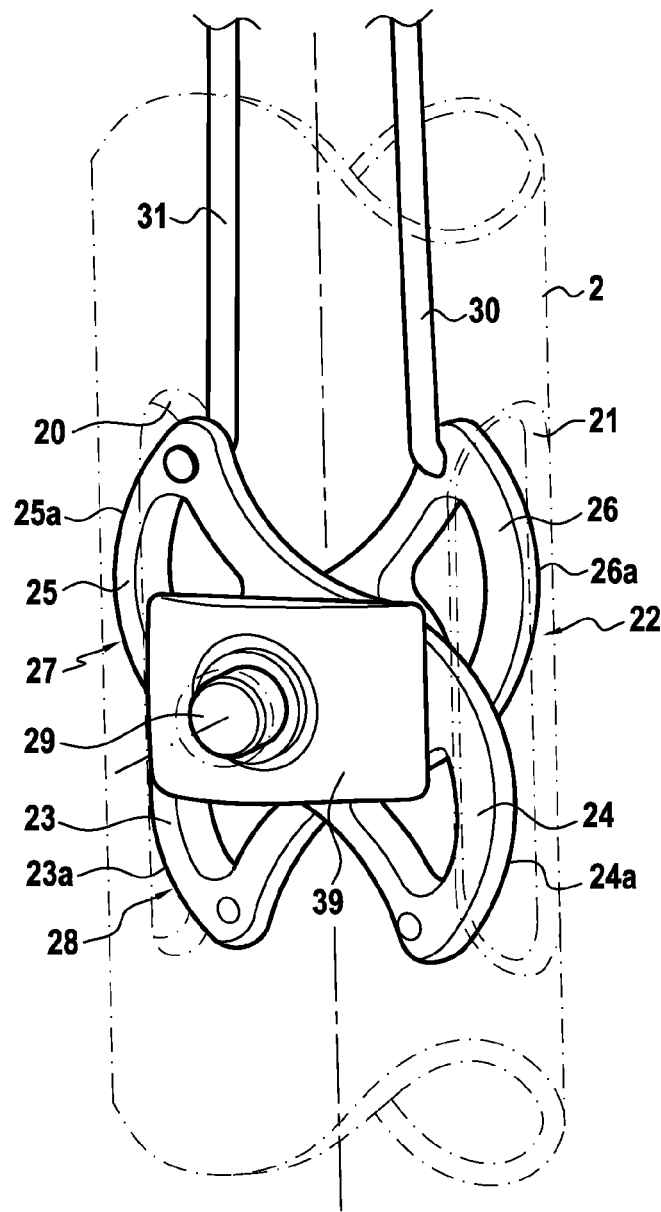
FIG. 4 shows a variant design of the locking device arranged inside the saddle post.

FIG. 4 shows a variant design of the locking device. In FIG. 4, the locking device 22 has four cams 23, 24, 25, 26 that are mounted in a cross configuration. The two cams 23 and 26 are implemented by means of a single, common part 27 having the shape of a hysteresis curve. Similarly, the two cams 24 and 25 are implemented by means of a single, common part 28 having the shape of a hysteresis curve and that is symmetrical relative to the first part 27 about the longitudinal axis of the saddle post. This first part 27 and this second part 28 are connected together and to pivot by a pivot pin 29 disposed perpendicularly to the longitudinal axis of the saddle post 2 and passing through said longitudinal axis, said pivot pin being stationary relative to the saddle post 2. It can also be seen that the cam 28 and the cam 26 are disposed symmetrically about the pivot pin 29 or asymmetrically about the longitudinal axis of the saddle post 2. Similarly, the cam 25 and the cam 24 are disposed symmetrically about said pivot pin 29 or asymmetrically about the longitudinal axis of the saddle post 2.

It can be observed in FIG. 4 that the distal ends 23a, 24a, 25a, 26a are in the shape of drops of water configured to accentuate the pressure exerted against the inside face of the saddle tube 3 when an attempt is made to move the saddle post 2 relative to the saddle tube 3 in either direction along the longitudinal axis of the saddle post 2. Thus, by means of these water-drop shapes, the distal ends 23a, 24a of the two cams 23, 24 accentuate the pressure on the inside face of the saddle tube 3 when the saddle 2 is urged to move into the saddle tube 3. Conversely, by means of their water-drop shapes, the distal ends 25a, 26a of the two cams 25, 26 make it possible to accentuate the pressure exerted on the inside face of the saddle tube 3 when the saddle post 2 is urged to move towards the outside of the saddle tube 3.

It can be observed in FIG. 4 that the first part constituting the two cams 23 and 26 is actuated by means of a first rod 30, while the second part 27 constituting the two cams 25 and 24 is actuated by means of a second rod 31 that extends longitudinally inside the saddle post 2.

It can be observed in FIG. 2 that the contact surfaces of the cams 6, 7, 8, 9 are provided with teeth 50, e.g. implemented by means of knurling, making it possible to increase the grip of the distal ends 6b, 7b, 8b, 9b of the cams 6, 7, 8, 9 in contact with the inside face of the saddle tube 3. Such teeth 50 may also be provided on the cams 23, 24, 25, 26 in the second design of the locking device 22 shown in FIG. 4.

As shown in FIG. 1, the rod 10 extends longitudinally inside the saddle post 2 to its top end 2a, out through which said rod 10 extends. Said rod is configured to be actuated by means of a drive handle 32, shown in FIG. 1. A similar design is possible with the two rods 30, 31 shown in FIG. 4.

This drive handle 32 makes it possible at least to move the rod 10 into a position in which said rod actuates the cams 6 and 7 and, via the spring 38, actuates the two cams 8 and 9, so as to disengage all four cams 6, 7, 8, and 9 from the inside face of the saddle tube 3, thereby enabling the saddle post 2 to slide relative to the saddle tube 3.

The locking device further includes a repositioning system for repositioning the cams into abutment against the inside face of the saddle tube 3 so as to lock the saddle post 2 relative to the saddle tube 3. This repositioning system may be implemented in various variant designs, as a function of said locking device. Thus, in the locking device 5 shown in FIGS. 1 to 3, a return spring (not shown in the figures) is preferably provided that is arranged between the saddle post 2 and the drive handle 32, which return spring makes it possible to actuate said drive handle 32 that acts on the rod 10 and that makes it possible to reposition the cams 6, 7, 8, 9 in abutment against the inside face of the saddle tube 3. Such a return spring can also be implemented between the drive handle and the top end 2a of the saddle post 2, with the locking device 22 shown in FIG. 4.

In the design of the locking device 22, shown in FIG. 4, a return spring (not shown in the figures) is arranged between the cams 23, 24, 25, 26 and the pivot pin 29 that is secured to the saddle post 2. This return spring is, in particular, of the spiral spring type and makes it possible to exert a force on the cams so as to press them against the inside face of the saddle tube 3 of the bicycle frame.

Figure 5:
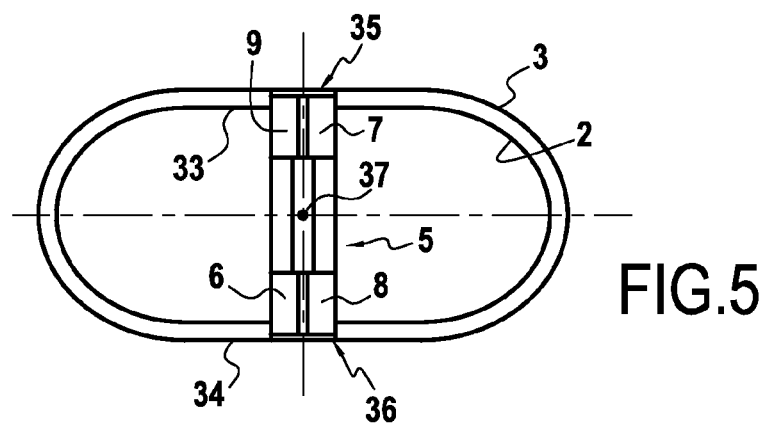
FIG. 5 shows a preferred design of the saddle tube and of the saddle post of the bicycle of the invention, on which a locking device of the invention is arranged.

Preferably, as shown in FIG. 5, the saddle post and the saddle tube are of cross-section having two flats facing each other. Thus, the saddle post 2 has two flats 33, 34 and the saddle tube 3 has two flats 35, 36. When the saddle post 2 is engaged in the saddle tube 3, this makes it possible to prevent the saddle post 2 from moving in rotation relative to the saddle tube 3, about the longitudinal axis 37 of the saddle post 2 and of the saddle tube 3. In addition, the cams, e.g. the cams 6, 7, 8, 9 of the locking device 5 shown in FIG. 2 are configured to come into contact in said flat zones 35, 36 of the saddle tube 3, as shown diagrammatically in FIG. 5. This makes it possible to increase the area of contact between the cams and the flats 35, 36.

Other variant designs are possible without going beyond the ambit of the present invention. For example, in the designs shown in FIGS. 1 to 4, the locking device 5, 22 is incorporated into the saddle post 2. It is, however, possible to arrange such a locking device at the bottom end of the saddle post 2, outside of said saddle post. For this purpose, for example, it is possible to modify the shape of the parts 18, 39 for supporting the pivot pins 17, 19, 29 so as to fasten said parts 18, 39 to said bottom end 2b of the saddle post 2.

Naturally, it is possible to arrange such a locking device 5, 22 on other articles in which a first tube is slidably mounted inside a second tube and that require said first tube to be locked relative to said second tube.

The invention claimed is:

1. A locking device for locking together a first tube and a second tube that are configured to enable said first tube to slide in said second tube, the locking device comprising at least one rod configured to move inside the first tube and to be driven into two positions, from outside said first tube, said locking device comprising a cam system made up of at least two cams that are mounted on the first tube to pivot about at least one pivot pin perpendicular to a longitudinal axis of said first tube and that are configured to pivot either into a first position in which the cams are not in contact with the second tube and allow the first tube to slide inside the second tube, or into a second position in which each of the cams exerts pressure on the inside face of the second tube and prevents the first tube from sliding inside the second tube, the rod being assembled with the cam system and configured so that it at least moves the cams into their first position when said rod is in an unlocking position, a repositioning system being configured to return said cams into their second position, wherein said cam system is configured to accentuate the contact pressure of the cams on the inside face of the second tube when a force exerted on the first tube and urging said first tube to be moved both towards the inside of the second tube and also towards the outside thereof is increased.

2. A locking device according to claim 1, wherein the at least two cams further include four cams mounted in a cross configuration relative to one another, symmetrically and asymmetrically about the longitudinal axis of the first tube, said cams also being mounted to pivot about the pivot pin passing through the longitudinal axis of the first tube and fastened to said first tube.

3. A locking device according to claim 2, wherein a return spring is arranged between the cams and the pivot pin that is secured to the first tube, said return spring being configured to exert a force against the cams so as to press said cams against the inside face of the second tube.

4. A locking device according to claim 1, wherein the at least one rod moves longitudinally inside the first tube and extends out through a distal end of said first tube, which distal end is disposed outside the second tube.

5. A locking device according to claim 1, wherein the locking device further includes a second pivot pin and a third pivot pin and wherein the cam system includes two first cams connected together and to pivot by first pivot pin that is perpendicular to the longitudinal axis of the first tube and that is secured to the rod, said two first cams being respectively mounted to pivot about said second pivot pin and about said third pivot pin, which second and third pivot pins are perpendicular to the longitudinal axis of the first tube and are disposed symmetrically relative to each other about said longitudinal axis.

6. A locking device according to claim 5, wherein the locking device further includes a fourth pivot pin and wherein the at least two cams further include two second cams connected together and to pivot by said fourth pivot pin that is perpendicular to the longitudinal axis of the first tube, said two second cams being respectively mounted to pivot about the second pivot pin and the third pivot pin, said two second cams being disposed symmetrically relative to the two first cams about an axis of symmetry passing through the second and third pivot pins, a return spring being arranged between the first pivot pin and the fourth pivot pin.

7. A locking device according to claim 6, wherein each of the second cams is provided with an oblong hole configured for slidably receiving the fourth pivot pin.

8. A locking device according to claim 5, wherein each of the two first cams is provided with an oblong hole configured for slidably receiving the first pivot pin.

9. A locking device according to claim 1, wherein the at least two cams are disposed inside the first tube, said first tube being provided with at least two slots configured to allow the cams to pass through so as to dispose them in their second position in contact against the inside face of the second tube.

10. A locking device according to claim 1, wherein each of the at least two cams has at least one contact surface for coming into contact against the inside face of the second tube, said contact surface being provided with teeth configured to grip the inside face of the second tube.

11. A locking device according to claim 1, wherein said device further comprises a drive handle secured to the rod, said drive handle being configured at least to move the rod into its unlocking position.

12. A locking device according to claim 11, wherein a return spring is arranged between the first tube and the drive handle, said return spring being configured to exert thrust on the rod and to return the cams to their second position.

13. A bicycle including a frame having a saddle tube, a saddle, and a saddle post extending said saddle downwards, said saddle post being mounted to slide in the saddle tube, said bicycle further including a locking device according to claim 1, wherein said saddle post constitutes the first tube and said saddle tube constitutes the second tube.

14. A bicycle according to claim 13, wherein a drive handle for driving the rod is disposed under the saddle.

15. A bicycle according to claim 14, wherein the saddle post and the saddle tube each has a cross section including two flats opposite each other, the cams bearing against the flats in the saddle.

* * * * *